(12) United States Patent
Najork

(10) Patent No.: US 7,792,854 B2
(45) Date of Patent: Sep. 7, 2010

(54) QUERY DEPENDENT LINK-BASED RANKING

(75) Inventor: Marc A. Najork, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 354 days.

(21) Appl. No.: 11/975,789

(22) Filed: Oct. 22, 2007

(65) Prior Publication Data

US 2009/0106230 A1 Apr. 23, 2009

(51) Int. Cl.
*G06F 7/00* (2006.01)
*G06F 17/30* (2006.01)

(52) U.S. Cl. ........................... 707/765; 707/776
(58) Field of Classification Search ............... 707/1–10, 707/100–104.1, 200–206
See application file for complete search history.

(56) References Cited

U.S. PATENT DOCUMENTS

| | | | |
|---|---|---|---|
| 6,321,220 B1 * | 11/2001 | Dean et al. ................... | 707/3 |
| 6,560,600 B1 * | 5/2003 | Broder ........................ | 707/7 |
| 6,778,997 B2 | 8/2004 | Sundaresan et al. | |
| 7,080,073 B1 | 7/2006 | Jiang et al. | |
| 7,117,207 B1 | 10/2006 | Kerschberg et al. | |
| 2005/0086260 A1 | 4/2005 | Canright et al. | |
| 2006/0173830 A1 | 8/2006 | Smyth et al. | |
| 2006/0224565 A1 | 10/2006 | Ashutosh et al. | |
| 2007/0118521 A1 | 5/2007 | Jatowt et al. | |
| 2007/0143273 A1 | 6/2007 | Knaus et al. | |

OTHER PUBLICATIONS

Haixuan Yang et al., Predictive Random Graph Ranking on the Web, Oct. 30, 2006, IEEE, 1825-1832.*
Xiaolin et al., An efficient range search algorithm for visualizing extrema of volume data, 1999, IEEE, 132-138.*
Henzinger Monika R., "Hyperlink Analysis for the Web", Date: 2001, vol. 5, Issue: 1, pp. 45-50.
Haveliwala Taher H., "Efficient Computation of PageRank", Date: Oct. 18, 1999, pp. 1-15.
Li, et al., "Improvement of HITS-based Algorithms on Web Documents", Date: May 7-11, 2002, pp. 527-535.
Mihalcea Rada, "Graph-based Ranking Algorithms for Sentence Extraction, Applied to Text Summarization", pp. 1-4, Oct. 22, 2007.
Ramadhan, et al., "A Heuristic Based Approach for Increasing the Page Ranking Relevancy in Hyperlink Oriented Search Engines: Experimental Evaluation", Date: 2006, vol. 1, No. 1, pp. 49-62.

* cited by examiner

*Primary Examiner*—Jean B Fleurantin

(57) ABSTRACT

Query dependent ranking uses weighted edges in a stochastic approach for link structure analysis (SALSA) technique. Functions describing the weights of edges into and out of a vertex are determined to define transition probability functions. The transition probability functions are used to compute authority scores for each uniform resource locator (URL) u in a base set to rank a result set to a received query.

11 Claims, 4 Drawing Sheets

QUERY DEPENDENT LINK-BASED RANKING

BACKGROUND

It has become common for users of host computers connected to the World Wide Web (the "web") to employ web browsers and search engines to locate pages having specific content of interest to users. A search engine, such as Microsoft's Live Search, indexes tens of billions of pages maintained by computers all over the world. Users of the host computers compose queries, and the search engine identifies pages that match the queries, e.g., pages that include key words of the queries. These pages are known as a "result set." In many cases, particularly when a query is short or not well defined, the result set can be quite large, for example, hundreds or thousands of pages or more. The pages in the result set may or may not satisfy the user's actual information needs. The vast majority of users is not interested in retrieving the entire huge set of resources, and rather is satisfied with a relatively limited number of authoritative results which are highly relevant to the topic of the query.

A number of search engines rely on many features in their ranking techniques. Sources of evidence can include textual similarity between query and documents or query and anchor texts of hyperlinks pointing to documents, the popularity of documents with users measured for instance via browser toolbars or by clicks on links in search result pages, and hyper-linkage between web pages, which is viewed as a form of peer endorsement among content providers. The effectiveness of the ranking technique can affect the relative quality, or relevance, of pages with respect to the query, and the probability of a page being viewed.

SUMMARY

In some implementations ranking of query results can be performed in accordance to a method that includes receiving a query and determining a neighborhood graph of results satisfying the query. Weights of the edges of the neighborhood graph may be determined, and the results satisfying the query may be ranked based on an authority score determined in accordance with the weights of the edges of the neighborhood graph.

In some implementations, a method includes maintaining a web graph having a vertex set and an edge set. A result set may be determined in accordance with results of a query, which may be used to determine a base set. A neighborhood graph may be determined in accordance with the base set and the edge set, and edges in the neighborhood graph may be weighted. Results to the query may be ranked in accordance with the weighting of the edges.

In some implementations, a system includes a search engine that receives a query containing search terms and provides a result set responsive to the query. A ranking engine may rank results within the result set in order of relevance, and a database may store an index of information. The ranking engine may create a neighborhood graph of the results and may rank the results in accordance with weights of edges in the neighborhood graph.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific processes and instrumentalities disclosed. In the drawings.

DETAILED DESCRIPTION

Figure 1:
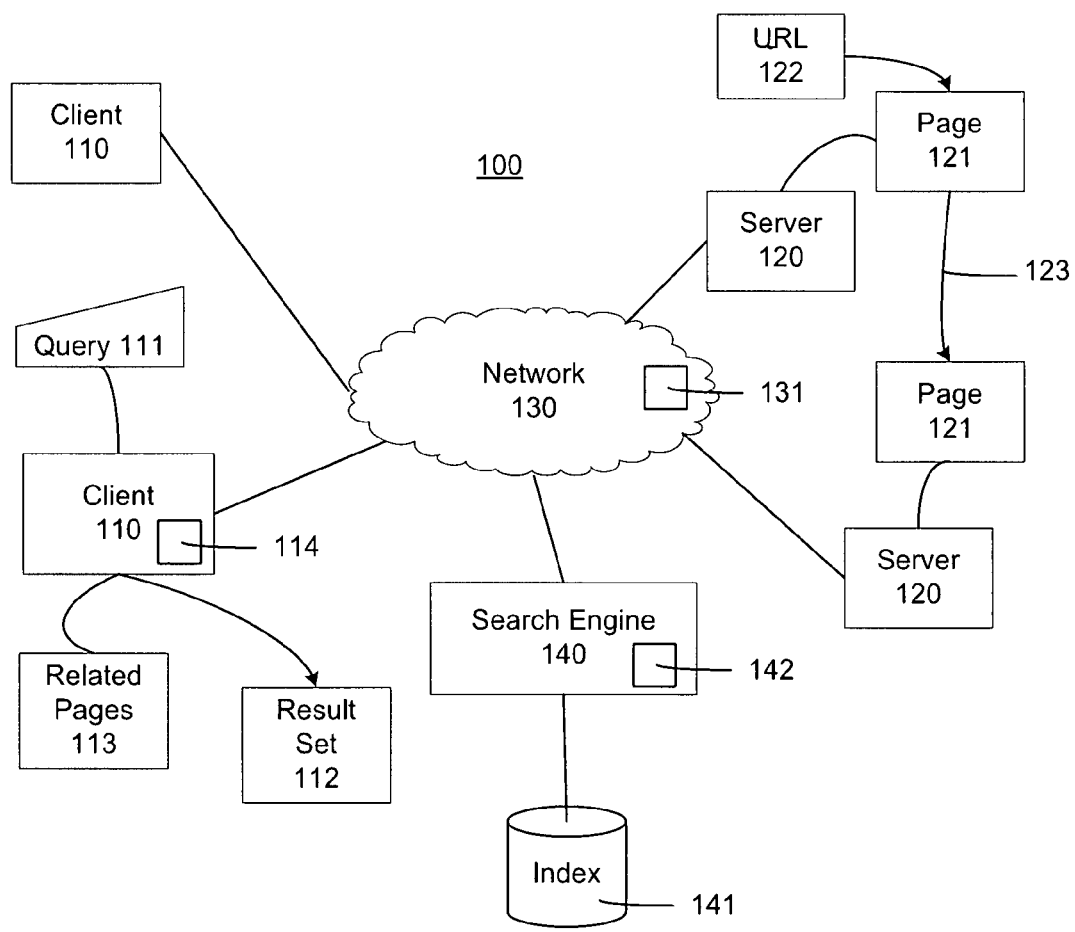
FIG. 1 illustrates an exemplary environment.

FIG. 1 illustrates an exemplary environment 100. The environment includes client computers 110 and server computers 120 (generally "hosts") connected to each other by a network 130, for example, the Internet, a wide area network (WAN) or local area network (LAN). The network 130 provides access to services such as the World Wide Web (the "web") 131. The web 131 allows the client computers 110 to access documents containing text-based or multimedia content contained in, e.g., pages 121 (e.g., web pages or other documents) maintained and served by the server computers 120. Typically, this is done with a web browser application program 114 executing in the client 110. The location of each page 121 may be indicated by an associated uniform resource locator (URL) 122 that is entered into the web browser application program 114 to access the page 121. Many of the pages may include hyperlinks 123 to other pages 121. The hyperlinks may also be in the form of URLs.

Although the implementation is described with respect to documents that are pages, it should be understood that the environment can include any linked data objects having content and connectivity that can be characterized.

In order to help users locate content of interest, a search engine 140 may maintain an index 141 of pages in a memory, for example, disk storage, random access memory (RAM), or a database. In response to a query 111, the search engine 140 may return a result set 112 that may satisfy the terms (keywords) of the query 111.

Because the search engine 140 stores many millions of pages, the result set 112, particularly when the query 111 is loosely specified, may include a large number of qualifying pages. These pages may or may not be related to the user's actual information needs. Therefore, the order in which the result set 112 is presented to the client 110 affects the user's experience with the search engine 140.

In an implementation, a ranking process may be implemented as part of a search engine 140 within a ranking engine 142. The ranking process may be based upon content analysis, as well as connectivity analysis, to improve the ranking of pages in the result set 112 so that just pages related to a particular topic are identified.

As illustrated in FIG. 1, the pages 121 may be a linked collection. In addition to the textual content of the individual pages, the link structure of such collections may contain information which can be used when searching for authoritative sources. In an implementation, a link may suggest that users visiting page p follow the link and visit page q. This may reflect the fact that pages p and q share a common topic of interest. Such a link is called an informative or authoritative link, i.e., it is the way page p confers authority on page q.

Informative links may provide a positive assessment of page q's contents from a source outside the control of the author of page q.

The vicinity of a page 121 may be defined by the hyperlinks that connect the page 121 to other pages. A page 121 may point to other pages, and the page 121 may be pointed to by other pages. Close pages may be directly linked; farther pages may be indirectly linked via intermediate pages. This connectivity may be expressed as a graph where nodes represent the pages (e.g., a URL) and the directed edges represent the links (e.g. hyperlinks). The vicinity of all the pages in the result set, up to a certain distance, may be called the neighborhood graph.

Some ranking techniques attempt to identify "hub" pages and "authority" pages in the neighborhood graph for a user query. Hubs and authorities exhibit a mutually reinforcing relationship. To define a neighborhood graph, it is helpful to introduce a sampling operator and the concept of a link-selection predicate. Given a set A, the notation $S_n[A]$ draws n elements that are consistently sampled or uniformly sampled at random from A; $S_n[A]=A$ if $|A| \leq n$.

Given a web graph (V,E) with a vertex set V and an edge set E, a link section predicate P takes an edge (u, v) ∈ E. In an implementation, the following three link section predicates may be used:

All(u, v) ≡ true
IH(u, v) ≡ host(u)≠host(v)
ID(u, v) ≡ domain(u)≠domain(v)

where host(u) denotes the host of URL u, and domain(u) denotes the domain of URL u. All is true for all links, whereas IH is true only for links between web pages on different hosts ("inter-host links") links, and ID is true only for links on web pages in different domains ("inter-domain links").

The outlinked-set of the result set R with respect to a link-selection predicate P may be defined as:

$$O^P = \bigcup_{u \in R} \{v \in V : (u,v) \in E \wedge P(u,v)\}$$

The inlinking-set of the result set R with respect to a link-selection predicate P and a sampling value s may be defined as:

$$I_s^P = \bigcup_{v \in R} S_s[\{u \in V : (u,v) \in E \wedge P(u,v)\}]$$

The base set B of the result set R with respect to P and s may be defined as:

$$B_s^P = R \cup I_s^P \cup O^P$$

The neighborhood graph may be defined as follows:

$$(B_s^P, N_s^P)$$

The neighborhood graph may have the base set as its vertex set and an edge set containing those edges in E that are covered by the base set and permitted by P:

$$N_s^P = \{(u,v) \in E : u \in B_s^P \wedge v \in B_s^P \wedge P(u,v)\}$$

To simplify the notation, B denotes the base set and N denotes the neighborhood edge set. As such, in(v) may be used to denote the neighborhood graph in-degree of v as follows:

$$in(v) = |\{u \in B : (u,v) \in N\}|$$

and out(u) may be used to define the neighborhood graph out-degree of u as follows:

$$out(u) = |\{v \in B : (u,v) \in N\}|$$

The "Stochastic Approach for Link-Structure Analysis" (SALSA) technique examines random walks on graphs derived from the link structure among pages in a search result. SALSA is a query-dependent technique and takes the result set to a query as input and expands it to include pages at distance one in the web graph. SALSA is based upon the theory of Markov chains, and relies on the stochastic properties of random walks performed on a collection of sites to compute a hub score and an authority score for each node in the neighborhood graph.

Authorities are pages that are recognized as providing significant, trustworthy, and useful information on a topic. A high authority score is indicative of relevant content. Hubs are index pages that provide many useful links to relevant content pages (topic authorities). A high hub score is indicative of links to documents with relevant content.

In an implementation, SALSA computes the authority score A(u), estimating how authoritative u is on the topic induced by the query, and the hub score H(u), indicating whether u is a good reference to many authoritative pages as follows:

To compute hub scores:
1. Let $B^H$ be $\{u \in B : out(u) > 0\}$
2. For all $u \in B$:

$$H(u) := \begin{cases} \frac{1}{|B^H|} & \text{if } u \in B^H \\ 0 & \text{otherwise} \end{cases}$$

3. Repeat until H converges:
   (a) For all $u \in B^H$:

$$H'(u) := \sum_{(u,v) \in N} \sum_{(w,v) \in N} \frac{H(w)}{in(v)out(w)}$$

(b) For all $u \in B^H$: H(u):=H'(u)

To compute authority scores:
1. Let $B^A$ be $\{u \in B : in(u) > 0\}$
2. For all $u \in B$:

$$A(u) := \begin{cases} \frac{1}{|B^A|} & \text{if } u \in B^A \\ 0 & \text{otherwise} \end{cases}$$

3. Repeat until A converges:
   (a) For all $u \in B^A$:

$$A'(u) := \sum_{(v,u) \in N} \sum_{(v,w) \in N} \frac{A(w)}{out(v)in(w)}$$

(b) For all $u \in B^A$: A(u):=A'(u)

In an implementation, weighted edges may be used with SALSA to generate the hub and authority scores. Two functions i and o measure how reachable a vertex is from the result set:

$$i(u) = |\{v \in R : (u,v) \in N\}|$$

$$o(v) = |\{u \in \overline{R} : (u,v) \in N\}|$$

From the above, the weight of an edge from u to v may be defined as follows:

$$c_i(u) = \begin{cases} i(u) + o(v) & \text{if } (u, v) \in N \\ 0 & \text{otherwise} \end{cases}$$

Next, two functions, $c_i$ and $c_o$, may be defined that sum up the weights of the edges that lead into and out of a vertex:

$$c_i(u) = \sum_{(x,u) \in N} io(x, u)$$

$$c_o(u) = \sum_{(u,x) \in N} io(u, x)$$

From these, a transition probability may be defined as:

$$p_i(u, v) = \frac{io(u, v)}{c_i(v)}$$

$$p_o(u, v) = \frac{io(u, v)}{c_o(u)}$$

In an implementation, authority scores may be defined as follows from the above-definitions:

1. Let $B^A$ be $\{u \in B : c_i(u) > 0\}$
2. For all $u \in B$:

$$A(u) := \begin{cases} \frac{1}{|B^A|} & \text{if } u \in B^A \\ 0 & \text{otherwise} \end{cases}$$

3. Repeat until A converges:
   (a) For all $u \in B^A$:

$$A'(u) := \sum_{(v,u) \in N} \sum_{(v,w) \in N} p_o(v, u) p_i(v, w) A(w)$$

(b) For all $u \in B^A$: $A(u) := A'(u)$

The authority scores generated using a neighborhood graph with weighted edges may be used to rank nodes representing pages in a result set that satisfy a query.

Figure 2:
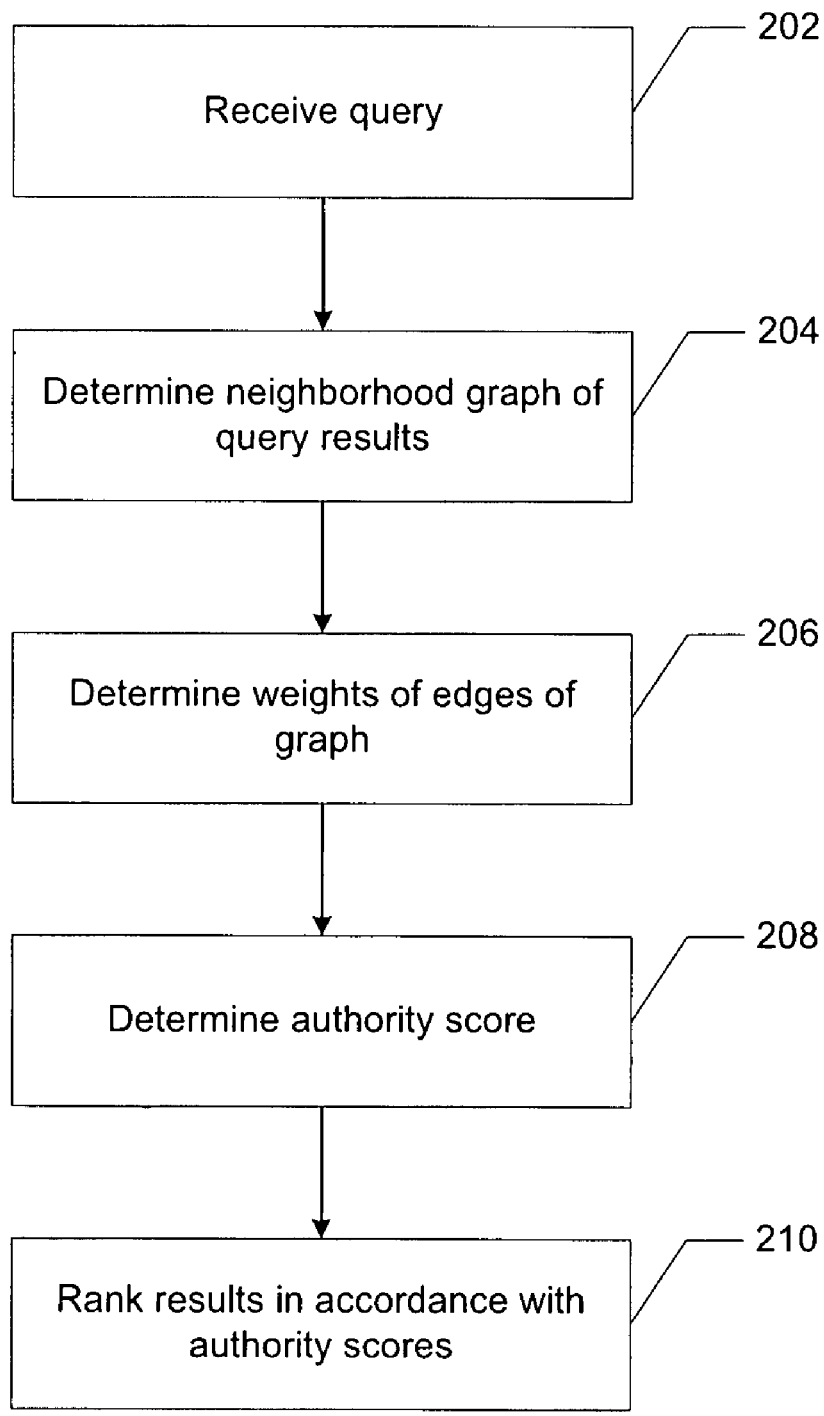
FIG. 2 illustrates an exemplary process of ranking results to a query.

FIG. 2 illustrates an exemplary process 200 of ranking results to a query. At stage 202, a query may be received. In an implementation, a query may be received by the search engine 140 in FIG. 1. At stage 204, a neighborhood graph of query results may be determined. The search engine 140 may access the index 141 to determine results to the query where the results are pages (nodes) connected by hyperlinks (edges) that satisfy the query terms.

At stage 206, weights of the edges may be determined. In an implementation, weights of the edges may be assigned based on the likelihood that the edge (hyperlink) will be followed.

At stage 208, an authority score may be determined. The authority score for each node (e.g., page) may be determined to estimate how authoritative each node is on the topic of the query.

At stage 210, the results may be ranked. In an implementation, by applying the authority scores to each node, a page ranking of the query results may be determined.

Figure 3:
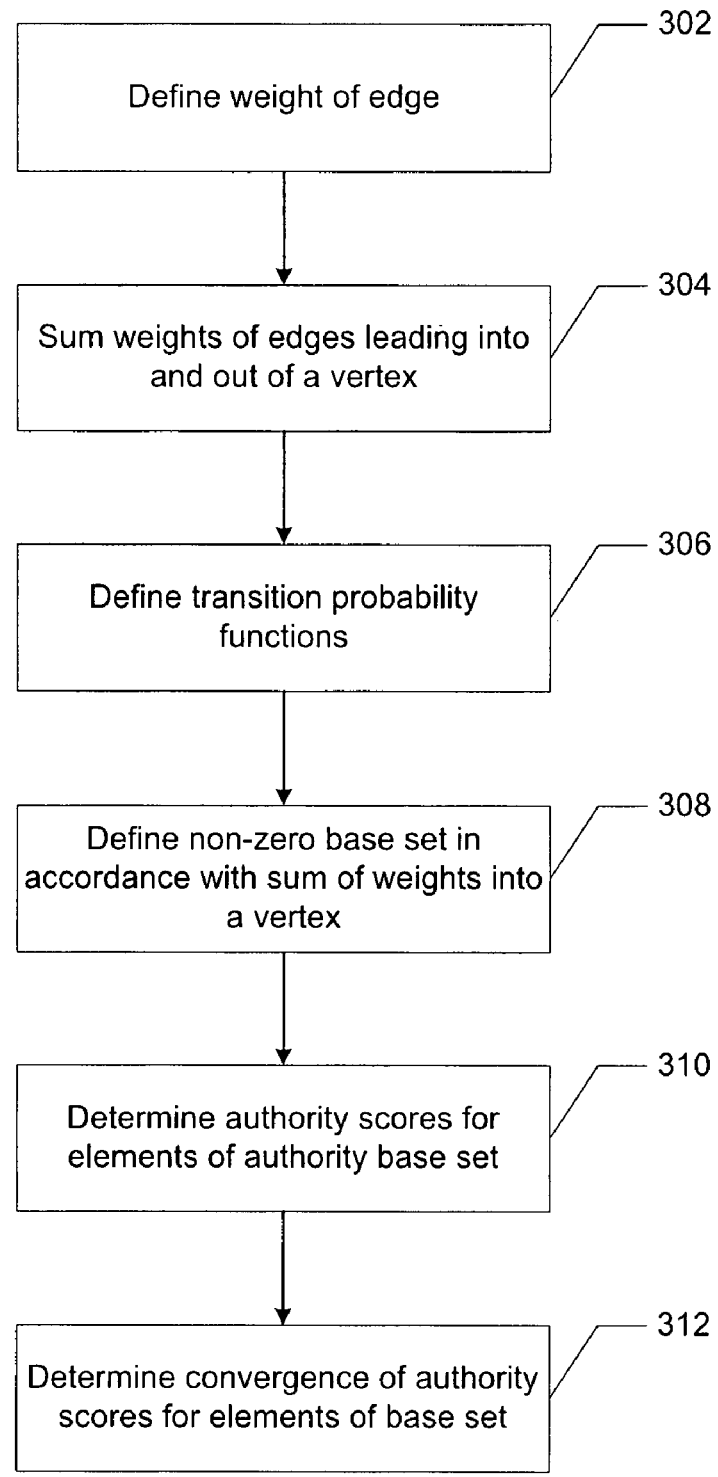
FIG. 3 illustrates an exemplary process of determining an authority score using weighted edges.

FIG. 3 illustrates an exemplary process 300 of determining an authority score using weighted edges. A stage 302, the weight of an edge may be defined. In an implementation, the functions i(u) and o(u) may be defined that measure how reachable a vertex is from the result set. The weight of an edge from u to v is the sum of i(u) and o(u).

At stage 304, the weights of the edges leading into and out of a vertex may be summed. The function $c_i(u)$ may be defined to sum up the weights of the edges leading into a vertex and the function $c_o(u)$ can be defined to sum up the weights of the edges leading out of a vertex.

At stage 306, transition probability functions may be defined. The functions $p_i(u,v)$ and $p_o(u,v)$ may be defined for each edge based on the weight of the edge and the sum of the weights of the edges. In a random walk on the neighborhood graph, $p_i(u,v)$ may be defined as the probability that the edge (u,v) will be traversed in a backward step starting at v, and $p_o(u,v)$ may be defined as the probability that the edge will be traversed in a forward step starting at u.

At stage 308, a base set of vertices having non-zero sums of the weights into a vertex may be determined. In an implementation, the base set may be those pages u in the base set for which $c_i(u)$ is greater than zero. Thus, the set of vertices in a base set whose in-degree is greater than zero is determined. This is determined because a random walk may be performed on a neighborhood graph using a step backward. For a step backward, a vertex that has an incoming edge is used.

At stage 310, an initial authority score A(u) is determined. In an implementation, this may be determined for each URL u in the base set where $c_i(u)$ is greater than zero. For the vertices that have no incoming edge, the authority score is set to zero. For the vertices that do have an incoming edge, normalization may be performed so that the sum of each authority score equals one.

At stage 312, convergence of the authority scores may be performed for each of the vertices that have incoming edges. This means that the authority score A(u) is iteratively determined until the latest version of A(u) (i.e., A'(u)) is not substantially different from the previous version of A(u). In an implementation, to determine the probability that a move is made from a vertex (e.g., URL) w to a vertex u via a vertex v, the authority score A(u) is determined and converged for each vertex that connects to vertex u. These probabilities may be summed, with the results being stored in A'(u), and then A'(u) may be copied back into A(u).

For each URL u, the authority score determined by the exemplary implementations above may be used to rank the results to a user query (e.g., at stage 210).

Exemplary Computing Arrangement

Figure 4:
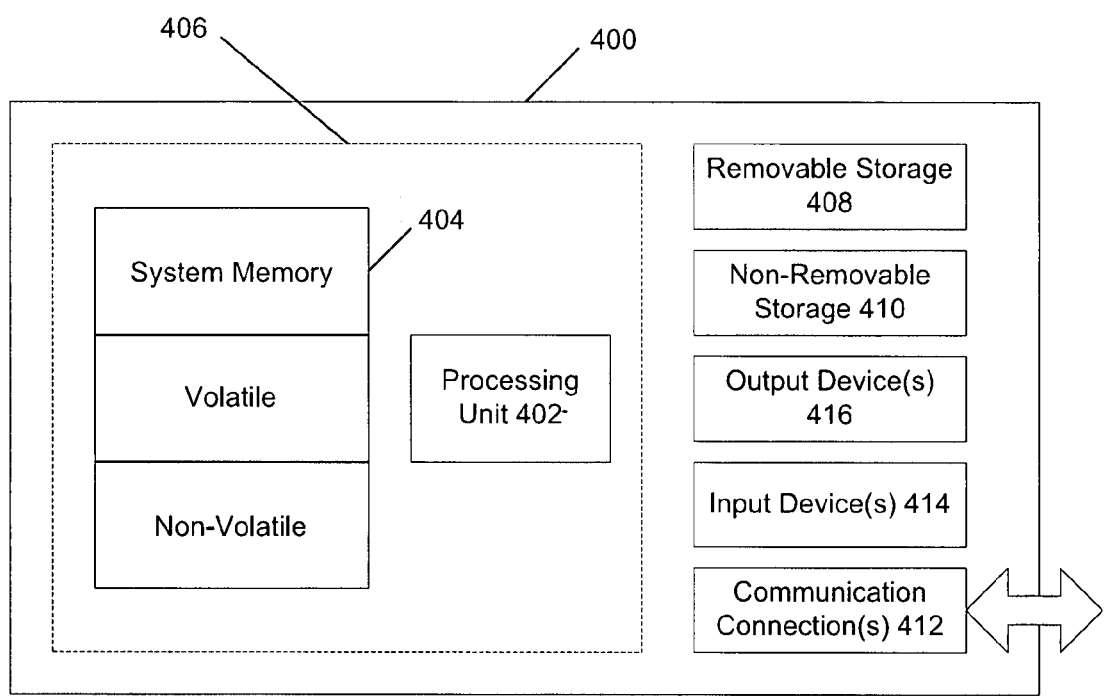
FIG. 4 shows an exemplary computing environment.

FIG. 4 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as RAM), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by device 400 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may contain communications connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, comprising:
   determining a neighborhood graph of results satisfying a query;
   determining weights of edges of the neighborhood graph;
   determining an authority score in accordance with the weights of the edges; and
   ranking the results satisfying the query based on the authority score using a ranking engine executing on a computing device, wherein ranking the results comprises ranking the results based on a query-dependent weighting of the edges of the neighborhood graph, and wherein the query-dependent weighting is determined based on a reachability of a vertex in the neighborhood graph from a result set that comprises the results.

2. The method of claim 1, further comprising performing a random walk on the neighborhood graph, wherein at every step of the random walk, a backward edge is chosen at random with a probability proportional to the weight of the backward edge, and then a forward edge is chosen at random with a probability proportional to the weight of the forward edge.

3. The method of claim 1, further comprising defining the weights of the edges in accordance with an edge set and a base set.

4. A method, comprising:
   determining a neighborhood graph of results satisfying a query;
   determining weights of edges of the neighborhood graph;
   determining an authority score in accordance with the weights of the edges;
   ranking the results satisfying the query based on the authority score using a ranking engine executing on a computing device;
   determining a transition probability function for the weights of the edges that lead into a vertex of the neighborhood graph; and
   determining a transition probability function for the weights of the edges that lead out of the vertex.

5. The method of claim 4, further comprising determining the authority score in accordance with the transition probability function for the weights of the edges that lead into the vertex and the transition probability function for the weights of the edges that lead out of the vertex.

6. The method of claim 5, further comprising determining a base set of vertices having non-zero sums of the weights into a vertex.

7. A computing system, comprising:

a search engine that receives a query containing search terms and provides a result set responsive to the query;

a database that stores an index of information; and a ranking engine that ranks results within the result set in order of relevance, creates a neighborhood graph of the results, and ranks the results in accordance with weights of edges in the neighborhood graph, wherein the ranking is determined in accordance with an authority score that is determined in accordance with the weights of the edges, wherein the weights of edges that lead into and out of a vertex of the neighborhood graph are summed, and wherein at least one transition probability function for the weights of the edges that lead into and out of the vertex is determined.

8. The system of claim 7, wherein the authority score is determined in accordance with the transition probability function for the weights of the edges that lead into the vertex.

9. The system of claim 7, wherein the results are ranked based on a query-dependent weighting of the edges of the neighborhood graph, and wherein the weighting is determined based on a reachability of a vertex in the neighborhood graph from a result set that comprises the results.

10. The system of claim 7, wherein the weights of the edges are indicative of a likelihood of an edge being followed as a relevant result.

11. The system of claim 7, wherein a stochastic approach for link structure analysis (SALSA) technique is applied by the ranking engine to rank the results in accordance with the weights of the edges.

* * * * *